(12) United States Patent
Tisdale et al.

(10) Patent No.: US 6,422,018 B1
(45) Date of Patent: Jul. 23, 2002

(54) GAS TURBINE ENGINE MODULAR COOLING AND HEATING APPARATUS

(76) Inventors: Lloyd B. Tisdale; Robert L. Hauck; Paul T. Tisdale, Jr., all of P.O. Box 2728, Conroe, TX (US) 77305

( * ) Notice: Subject to any disclaimer, the term of this patent is extended or adjusted under 35 U.S.C. 154(b) by 6 days.

(21) Appl. No.: 09/640,836

(22) Filed: Aug. 17, 2000

(51) Int. Cl.[7] .............................................. F02C 7/143
(52) U.S. Cl. ...................................... 60/728; 62/259.1
(58) Field of Search .......................... 60/728; 62/259.1, 62/396

(56) References Cited

U.S. PATENT DOCUMENTS

| | | | | |
|---|---|---|---|---|
| 3,179,162 A | * | 4/1965 | McFarlan | 62/259.1 |
| 5,444,971 A | * | 8/1995 | Holenberger et al. | 60/728 |
| 5,758,502 A | * | 6/1998 | Utamura et al. | 60/728 |

FOREIGN PATENT DOCUMENTS

| | | | | |
|---|---|---|---|---|
| JP | 63-215842 | * | 9/1988 | 60/728 |

OTHER PUBLICATIONS

M. De Lucia, R. Bronconi, E. Carneval, Performance and Economic Enhancement of Cogeneration Gas Turbines Through Compressor Inlet Air Cooling, Transations of the ASME, 360 vol. 116, Apr. 1994 pp. 360–365.

M.A. AIT–ALI, Optimum Power Boosting of Gas Turbine Cycles With Compressor Inlet Air Refrigeration, Transactions of the ASME, 124/vol. 119, Jan. 1997, pp. 124–130.

* cited by examiner

Primary Examiner—Louis J. Casaregola
(74) Attorney, Agent, or Firm—Kenneth H. Johnson

(57) ABSTRACT

The present invention comprises a modular unit in which all of the components necessary for conditioning the intake air for a combustion gas turbine are contained. The compressors, evaporators condensers and related pumps and control equipment are contained within a weather proof enclosure having sound insulation installed in the walls. The intake air conditioning system includes three loops, a compressed refrigerant loop, a chilled water loop and a condenser cooling water loop with an optional heating loop. The modular unit provides a three loop cooling system for easy connection to both a combustion gas turbine air inlet and to a cooling water tower. The loops comprise a refrigerant loop, a cooling water loop and a chilled water loop and in one embodiment a heating loop to heat the air going to the turbine.

8 Claims, 6 Drawing Sheets

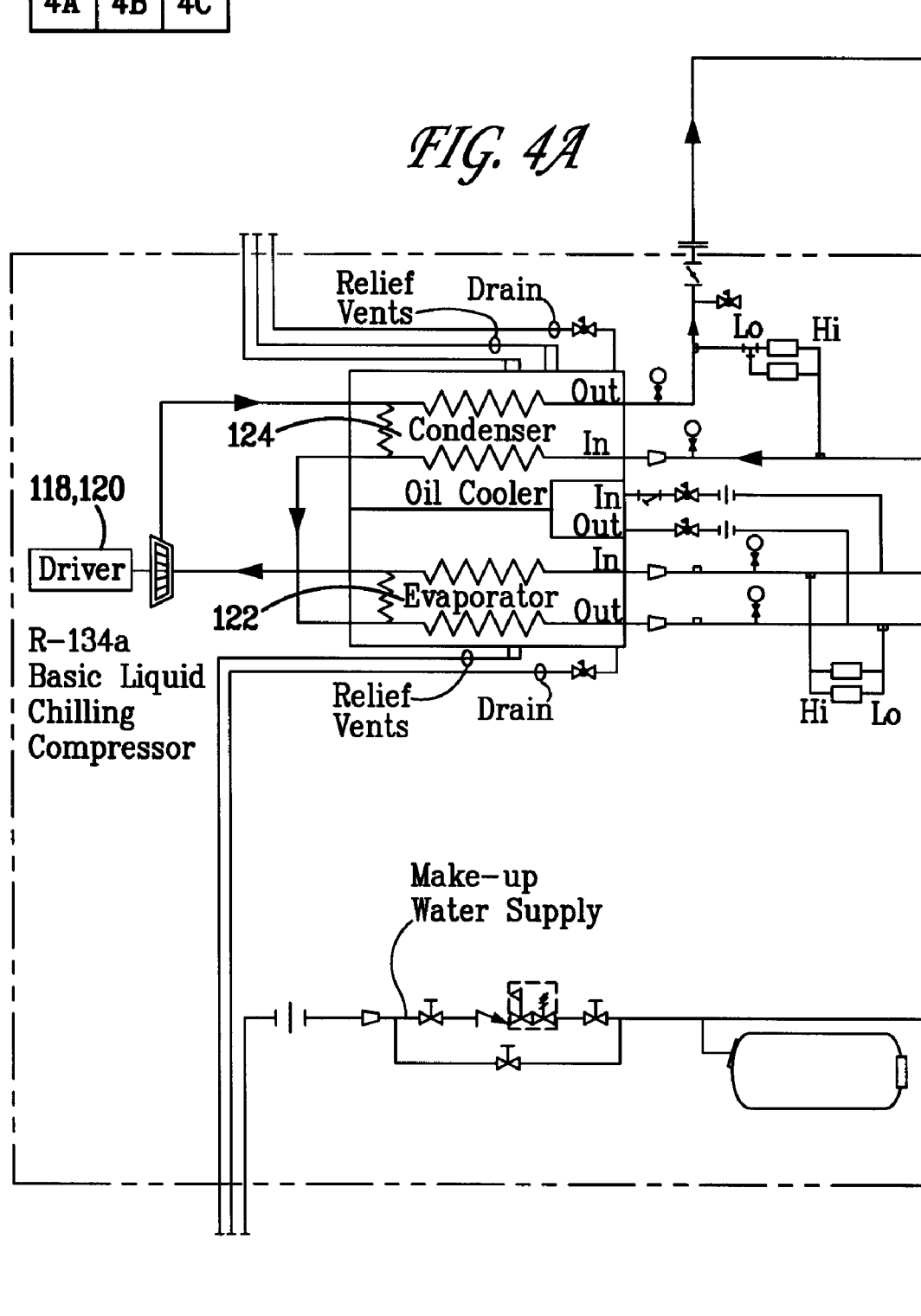

GAS TURBINE ENGINE MODULAR COOLING AND HEATING APPARATUS

BACKGROUND OF THE INVENTION

1. Field of the Invention

The present invention relates to an apparatus and process for heating and/or cooling of the intake air to a combustion gas turbine. More particularly the invention relates to a skid mounted modular unit that is manufactured off site and transported to the turbine location and connected with a minimum of on site construction. Most particularly the invention relates to a process and apparatus that utilize the exhaust heat from the turbine to indirectly heat the intake air to the turbine.

2. Related Information

In industry combustion gas turbines (C.G.T.'s) drive a variety of devices (i.e., generators, gas compressors, pumps, etc.) and are subject to continually changing ambient conditions, which can adversely affect their power output. The combustion gas turbine industry has always struggled with controlling the power of the turbine at varying intake ambient air temperatures. Some problems listed below (not all inclusive) are typical of users of combustion gas turbines have struggled with since the development of the combustion gas turbine:

1. Varying inlet temperatures resulting in varying combustion gas turbine power outputs and thus unpredictable work produced.
2. Varying temperatures related to increased maintenance and operating costs.
3. Conventional inlet chilling (using basic liquid chillers) and heating costs were high.
4. Conventional inlet chilling using basic liquid chillers of the reciprocating, screw or centrifugal type refrigeration compressors were not large enough regarding capacity to cool the combustion gas turbine large mass flow rates with redundant systems.
5. Basic liquid chillers with their ancillary components (pumps, cooling tower, electrical switchgear, piping, control systems, sound components, weatherproofing costs, buildings, civil work, and field assemble labor) required large physical areas to field assemble.
6. Field erected systems have been undependable with regard to guaranteed performance and parasitic electrical loads of the systems have been too high to justify installation.
7. Alternate methods of inlet cooling, such as evaporative cooling or water atomization into the combustion gas turbine inlet, while low in initial cost, do not maintain steady inlet temperatures with varying ambient conditions. Since these methods are completely dependent on evaporation of water, the higher the wet bulb temperature, the less effectively they cool. It is typically at high wet bulb temperature conditions that maximum combustion gas turbine output is needed.

SUMMARY OF THE INVENTION

The present invention comprises a modular unit in which all of the components necessary for conditioning the intake air for a combustion gas turbine are contained. The compressors, evaporators condensers and related pumps and control equipment are contained within a weather proof enclosure having sound insulation installed in the walls.

There are many aspects of the present invention that are unique and that have not been known in the prior art. These novel features include but are not limited to:

1. A single lift packaged modular combustion gas turbine chilling, control and monitoring system that can be installed without the use of (a) multiple disciplines, (b) engineering and construction site contractors, (c) untested products, (d) multi component vendors (i.e., chillers, pumps, controls, electrical components, etc.), (d) guesswork, (f) field welding, (g) insulation, (h) piping, (i) instrumentation, (j) structural systems, (k) weatherproofing and (I) provisions for extreme systems.
2. The present modular system is different from field erected systems in that it:
   (a) can be operated in hazardous environments without costly "explosion proofing" electrical modifications.
   (b) responds directly to C.G.T. operator's inlet air temperature sensing which is part of the operator's digital control system (D.C.S.). Field erect systems typically respond to chilling fluid temperatures.
   (c) provides electrical parasitic load (KW) data directly to operator's D.C.S. console.
   (d) provides auto-switchover of 100% stand-by pump on condender water or chilling liquid. Field erect systems require operator manual changeover with valves.
   (e) provides the entire process in fully weatherproof, thermally insulated, and sound attenuated enclosures. Field erected systems offer none of these items and require a building to provide any protection. Field erect systems offer no integrated modular designs on cooling and no optional integrated C.G.T. inlet heating modules for direct integration into the chilling process by way of:
      1. control system
      2. piping and valves
      3. heat exchanger
      4. electrical system
      5. commonality of components
   (f) provides compact, single lift modules, factory assembled, tested, and transportable on major highways to any site.
   (g) provides portable modules, easily moved to other sites and quickly connected for operation.
   (h) provides large capacity (cooling tons) modules which use simple 2-flow pass heat exchangers on liquid chilling and condensers, eliminating extensive and complicated series and parallel flow arrangements common to some field erected systems.
   (i) provides available multiple centrifugal compressors on single heat exchanger vessels for stand-by capability (50%/50%) and very efficient operation at partial loads. No other system offers this.
   (j) provides fully independent microprocessor control and safety logic for each centrifugal compressor.
   (k) uses R-134$a$ "chlorine free" refrigerant in capacities over 1,500 tons, an exclusive.
   (l) has the ability to control module temperature (ventilation, cooling, heating, and/or humidity control) surrounding all process system components so they are not affected by changing outdoor weather, and exclusive.
   (m) is fully assembled, pre-piped, pre-wired, insulated, and tested prior to shipment, and exclusive.
   (n) has the ability to reclaim C.G.T. exhaust heat through thermal oil/E.G. liquids and provide heating at C.G.T. inlet with the common components of the chilling system is unique to this process.
   (o) provides centrifugal compressors on liquid chilling systems are aircraft derivative design for fast start and fast stop of compressors, saving energy and eliminating costly "coast down" lubrication systems.

(p) provides single point power connections for entire system electrical distribution, safety, back up, and operation, a unique feature.

(q) provides reclaiming inlet chilling coil condensate to cooling tower make-up water stream for less make-up water usage and to improve tower efficiency.

DETAILED DESCRIPTION OF THE PREFERRED EMBODIMENT

Figure 1:
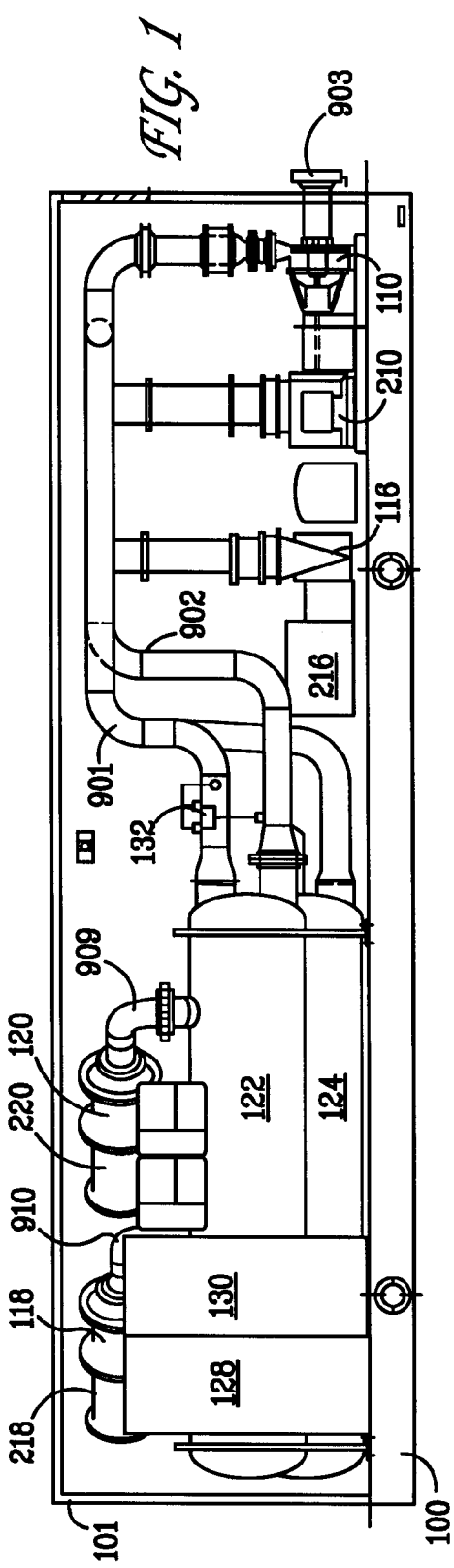
FIG. 1 is a side elevational view of one embodiment of the skid mounted modular combustion gas turbine intake air conditioner of the present invention.

The modular unit of the present invention provides a three-loop cooling system for easy connection to both a combustion gas turbine air inlet and to a cooling water tower. The loops comprise a refrigerant loop, a cooling water loop and a chilled water loop. The refrigerant loop contains a normal compressor, condenser and evaporator cycle with the condenser being cooled by cooling water from the cooling water loop. The refrigerant evaporator cools the water in the chilled water loop which is circulated to the combustion gas turbine air inlet. The chilled water takes heat from the combustion gas turbine inlet air; the refrigerant takes heat from the chilled water; and lastly the heat is finally removed to the atmosphere by a standard evaporative cooling tower via the cooling water loop.

The success of the modular unit is that the refrigerant is contained within the module and the temperature of the chilled water can be accurately controlled by circulation of refrigerant. There is no need to connect the refrigerant to the combustion gas turbine inlet air coolers. The use of the chilled water as opposed to using the cooling tower water allows the use of a smaller heat exchanger at the combustion gas turbine inlet as well as lower circulation rates to the exchanger.

The present modular combustion gas turbine intake air conditioner comprises:

(a) a base;

(b) a first refrigerant compressor mounted on said base, said refrigerant compressor having a refrigerant compressor suction and a refrigerant compressor discharge;

(c) a first refrigerant compressor driver mounted on said base and mechanically connected to said refrigerant compressor:

(d) a refrigerant condenser mounted on said base for indirect heat exchange between cooling water and refrigerant, said refrigerant condenser having a refrigerant inlet connected to said first refrigerant compressor discharge by a conduit, a refrigerant outlet, a condenser cooling water inlet and a condenser cooling water outlet;

(e) a conduit connected to said condenser cooling water outlet for connection to a cooling water return conduit;

(f) a first cooling water pump mounted on said base, said first cooling water pump having a first cooling water pump suction and a first cooling water pump discharge;

(g) a first cooling water pump driver mounted on said base and mechanically connected to said first cooling water pump;

(h) a conduit connected to said first cooling water pump suction for connection to a cooling water source;

(I) a conduit connecting said first cooling water pump discharge and said condenser cooling water inlet;

(j) a refrigerant evaporator mounted on said base for indirect heat exchange between refrigerant and chilled water, said refrigerant evaporator having a refrigerant inlet, a refrigerant outlet, a chilled water inlet and a chilled water outlet;

(k) a conduit connecting said refrigerant inlet to said refrigerant condenser outlet;

(l) a conduit connecting said refrigerant outlet to said first refrigerant compressor suction;

(m) first chilled water pump mounted on said base, said first chilled water pump having a first chilled water pump suction and a first chilled water pump discharge;

(n) a first chilled water pump driver mounted on said base and mechanically connected to said first chilled water pump;

(o) a conduit connecting said first chilled water pump discharge to said chilled water inlet; and (p) a conduit connected to said first chilled water pump suction for connection to a heat exchanger located in the air intake of a combustion gas turbine.

Preferably the present modular combustion gas turbine intake air conditioner according has a housing mounted on said base and enclosing said first refrigerant compressor, said first refrigerant compressor driver, said refrigerant condenser, said first cooling water pump, said first cooling water pump driver, said refrigerant evaporator, said first chilled water pump, said first chilled water pump driver and all of said conduits.

Preferably in the present modular combustion gas turbine intake air conditioner all of said drivers are electric motors and further comprising a wiring harness contained within said housing and providing electrical power to each of said drivers, said wiring harness having one connection between said wiring harness and an external electrical power source.

Figure 2:
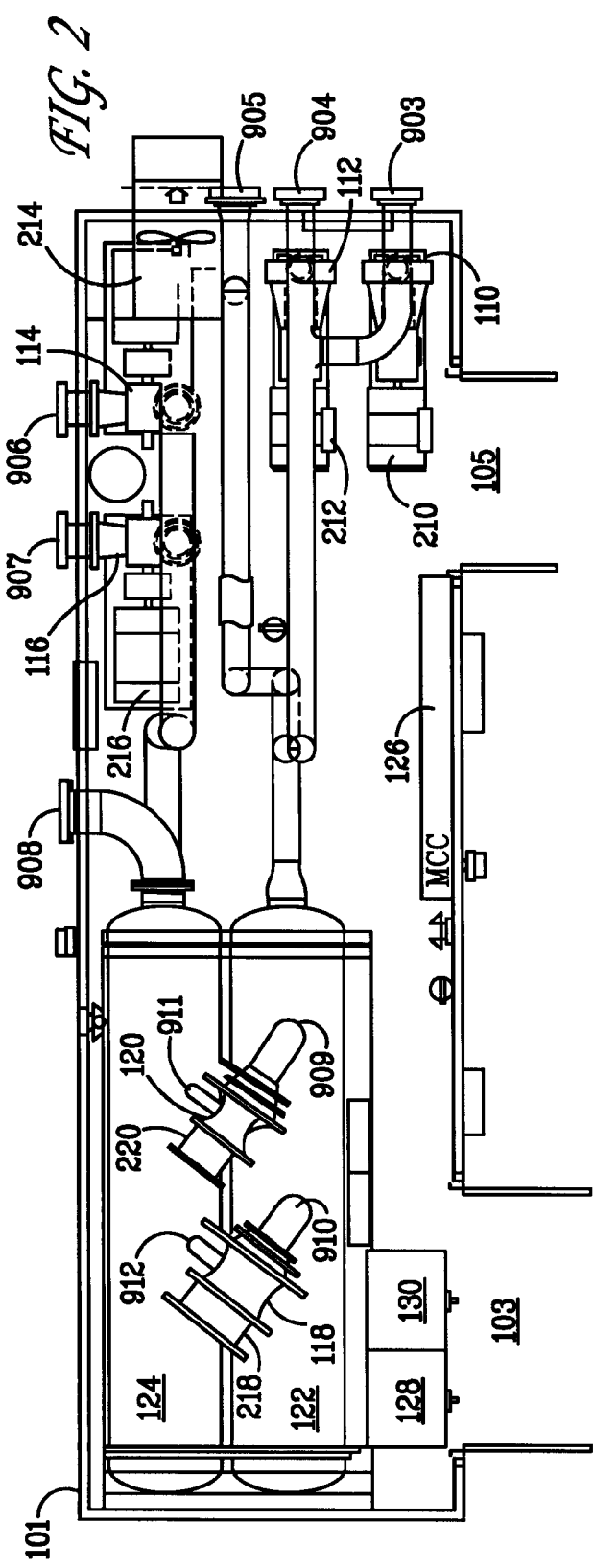
FIG. 2 is a top plan view of the embodiment shown in FIG. 1.

Referring now to FIG. 1 and FIG. 2 the general layout and construction of the modular unit can be seen. The entire unit is mounted on a skid 100. The main pieces of equipment include the chilled water pumps 110 and 112, each with a driver 210 and 212, respectively, the condenser water pumps 114 and 116 with their drivers 214 and 216, respectively, the refrigerant compressors 118 and 120 with their respective drivers 218 and 220, the refrigerant evaporator 122 and the refrigerant condenser 124. The compressors take suction from the evaporator 122 via suction lines 909 and 910 respectively and discharge into the condenser 124 via discharge lines 911 and 912. The piping is numbered to correspond to the flow diagram of FIG. 3 for easy reference.

The motor control panel is shown at 126 with the compressor starters shown at 128 and 130. A differential pressure sensor and switch 132 is provided between the chilled water inlet 901 and outlet 902 to the evaporator to shut down the pumps if the evaporator becomes fouled. Flanged connections are provided for chilled water inlets 903 and 904 (from the combustion air inlet heat exchanger—not shown) to the chilled water pumps 110 and 112 respectively; the chilled water outlet 905 (to the combustion air inlet heat exchanger—not shown); condenser water inlets 906 and 907 (from the cooling water tower—not shown) to condenser water pumps 114 and 116 respectively; and condenser water outlet 908 (to the cooling water tower—not shown).

The whole skid-mounted unit is surrounded by a modular container 101 having two separate doorway entries 103 and 105. Such ancillary equipment as control valves, lighting and ventilation may be included but are not shown.

Also conspicuously shown are the redundancy of the pumps and compressors. The modular unit includes the ability to automatically switch from one to the other upon failure or shut down of the one operating.

Figure 3A:
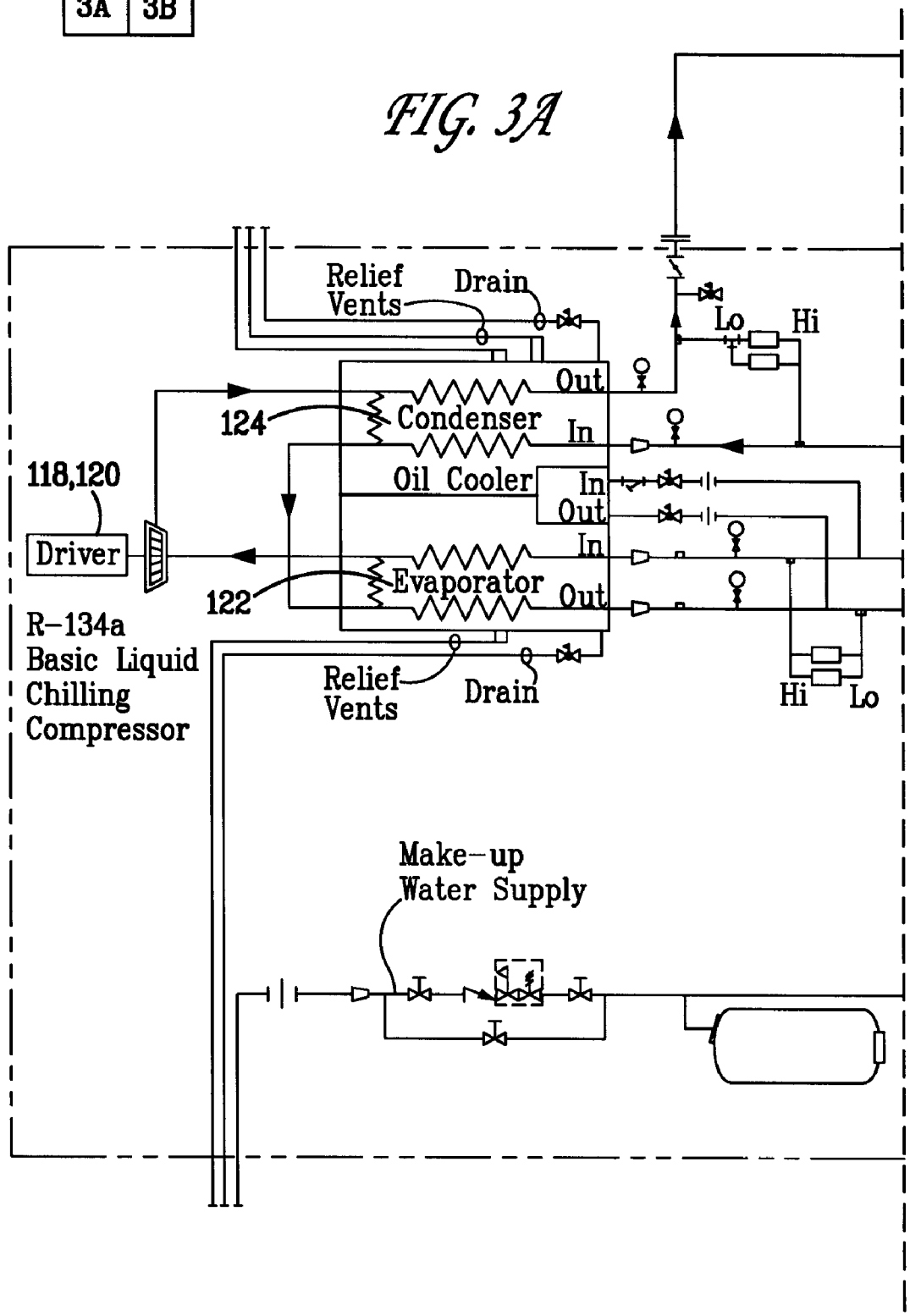
FIG. 3 is a simplified flow diagram showing the process using one embodiment of the invention.
Figure 3B:
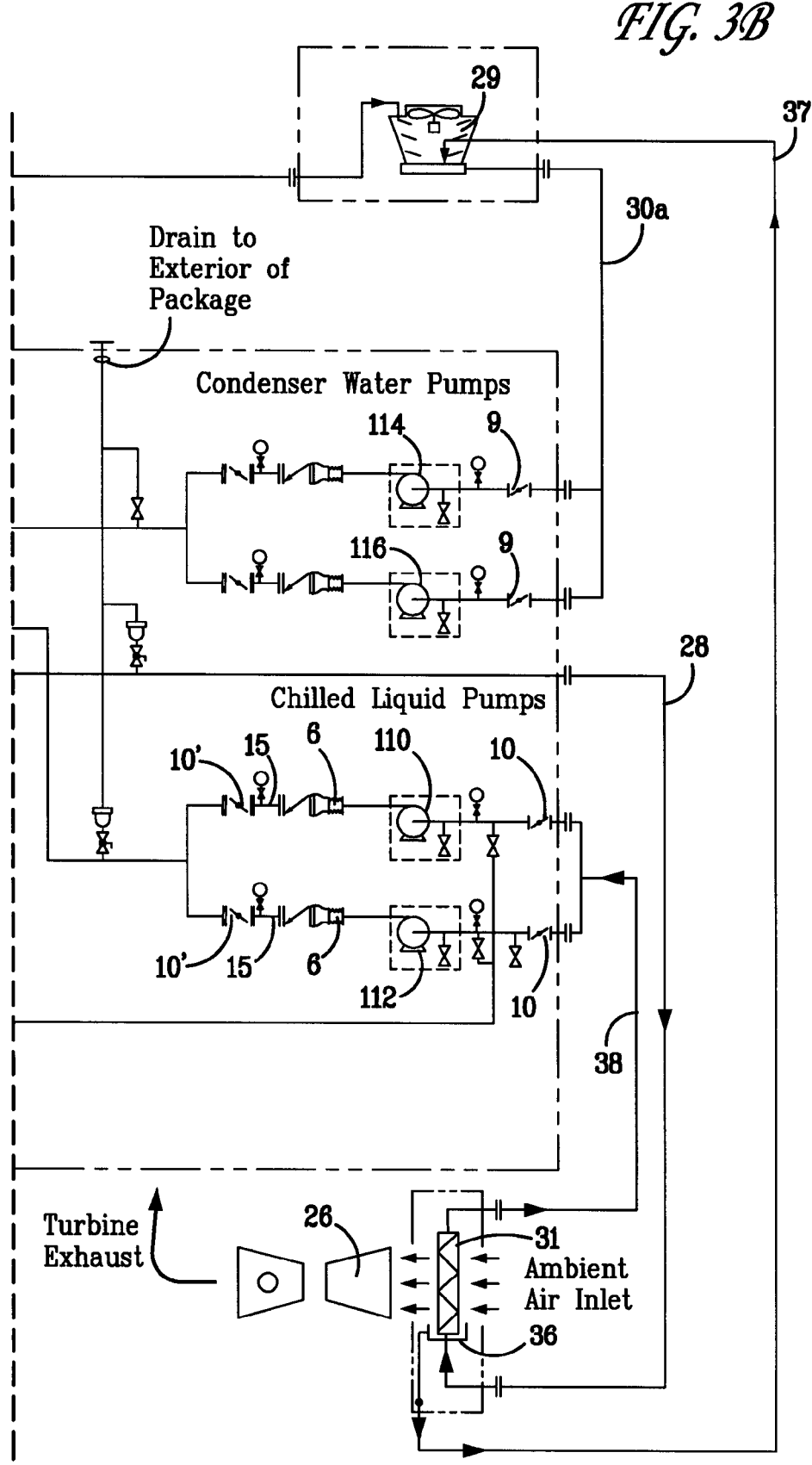

Referring now to FIG. 3, a flow diagram of the combustion gas turbine inlet air cooling process utilizing the present invention is shown. The process begins with heat being removed from the combustion gas turbine 26 inlet air through the fin tube heat exchanger 31 (commonly called the inlet chilling coils). This heat is transferred from the inlet chilling coils 31 to the chilling fluid and is carried to the chilling process through the liquid return line 38 where it enters the operating chilled liquid pump 110 or 112, noting that one pump is 100% stand-by. An isolation valve 10 is provided to facilitate pump service. The fluid is pumped through vibration isolator 6, check valve 15, balancing/isolation valve 10', and into the basic liquid chilling unit heat exchanger section 122 (evaporator) where heat is removed by indirect contact with evaporating refrigerant. The refrigerant is compressed in either of compressor 118 or 120 and then condensed in condenser 124 where the heat is removed by condenser water which in turn is cooled in the cooling tower 29 through an evaporative process (adiabatic) thereby reducing the condenser water temperature to acceptable levels and which is returned to the condenser through the condenser water supply line 30a, entering the operating condenser water pump 114 or 116, noting that one pump is 100% stand-by, through a shut-off/isolation valve 9. The condenser is then circulated through the condenser 125 again in a continuous process of heat rejection. Likewise the chilled liquid is recirculated to the inlet chilling coils 31 via line 28.

A unique feature of the present system is that the condensate water formed at the inlet chilling coils 31 is piped to the cooling tower 29 basin via line 37 to provide a water saving source of tower make-up water which replaces evaporated water from the cooling process. Typically this water is much cooler than existing basin water contributing to cooling tower efficiency. Since the condensate water from the inlet chilling coils 31 is pure, it helps reduce cooling tower blowdown used to keep total dissolved solids low. Usually the water flows from the collection pan 36 by gravity through the drain line 37 to the cooling tower basin.

Figure 4B:
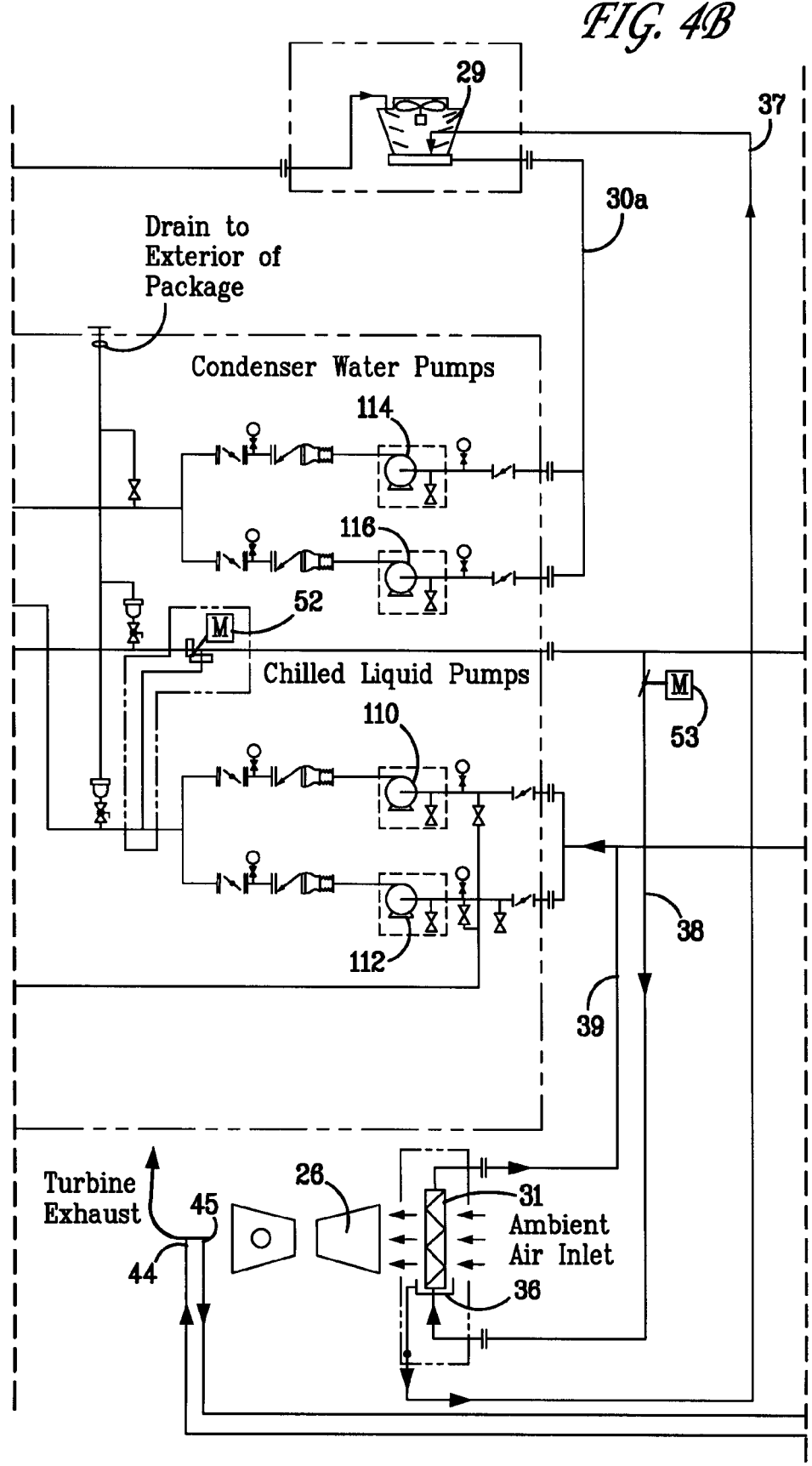
FIG. 4 is the embodiment of FIG. 3 with a heating section added.
Figure 4C:
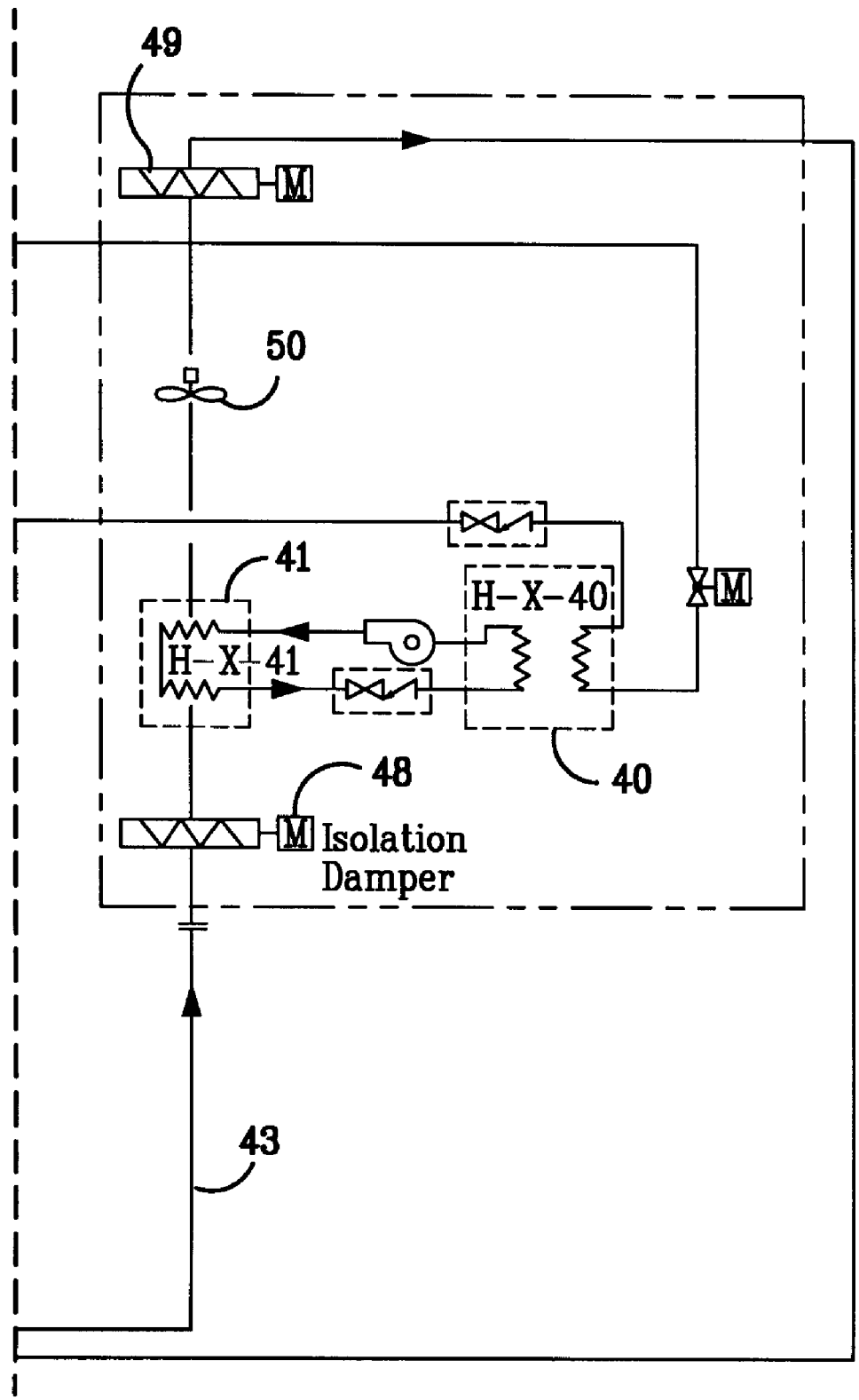

In another embodiment of the invention the inlet air may be heated to prevent ice formation and subsequent damage to the turbine. Essentially the process and apparatus are the same with a hot oil/ethylene glycol loop. This process is shown in the simplified flow diagram of FIG. 4. Ambient air enters the chilling coils 31 and is heated with a 54% ethylene glycol solution flowing through the inlet coils 31 via supply and return lines 38 and 39, which is being circulated by the operating chilled liquid pump 110 or 112. The ethylene glycol is pumped through the ethylene glycol/thermal oil heat exchanger 40 where the constant flow ethylene glycol is heated by the thermal oil and continues to supply heat to the inlet coils 31. In the thermal oil loop, the thermal oil pump 42 circulates from the ethylene glycol/thermal oil heat exchanger 40 through the thermal oil/exhaust gas exchanger 41 where the high temperature exhaust gas stream 43 heats the thermal oil.

The exhaust gas is taken from the main combustion gas turbine 26 exhaust stream at a point 44 and returned as closely as possible at point 45 to minimize thermal and acoustical impact on the combustion gas turbine exhaust stack attenuators.

The exhaust gas inlet 43 is allowed to flow to heat exchanger 41 when the system control sensor 46 enables the isolation damper 48 to full open position. Control damper 49 starts to modulate also in response to Temperature indicator proportioning signal. Forced air fan 50 operates at full speed to overcome the pressure drop of exchanger 41 with respect to exhaust gas pressure. When proper exhaust gas glow has been established over exchanger 41, both fan 50 speed and/or control damper 49 modulator controlled by temperature indicator 47 will maintain a constant loop temperature and combustion gas turbine inlet temperatures. When the combustion gas turbine inlet is satisfied or in non heating modes, the fan 50 will stop, the control damper 49 and isolation damper 48 will fully close to isolate the heating coil from the exhaust gas stream flow. Oil pump 42 will continue to circulate until the oil and ethylene glycol loop temperatures are reduced to acceptable levels.

A motorized bypass loop 52 is included in the module to allow the ethylene glycol flow to bypass the chilling evaporator 122, saving energy and avoiding exposing the evaporator 122 to excessive temperatures. The motorized bypass loop is fully automatic based on temperature indicator 47 set points, or can be manually selected by the combustion gas turbine operator. Also at initiation of inlet heating, balancing valve 55 limits the ethylene glycol loop side flow to exchanger 40 at a preset rate to accomplish design temperatures, and motorized control valve 53 closes to a preset value to force a portion of ethylene glycol loop flow through exchanger 40. Once the valves are at their preset points, the ethylene glycol pump 3 (chilled water pump), the thermal oil pump 42 and modulating functions of the fan 50 and damper 49 will commence.

What is claimed is:

1. A modular combustion gas turbine intake air conditioner comprising:

(a) a base;

(b) a first refrigerant compressor mounted on said base, said refrigerant compressor having a refrigerant compressor suction and a refrigerant compressor discharge;

(c) a first refrigerant compressor driver mounted on said base and mechanically connected to said refrigerant compressor:

(d) a refrigerant condenser mounted on said base for indirect heat exchange between cooling water and refrigerant, said refrigerant condenser having a refrigerant inlet connected to said first refrigerant compressor discharge by a conduit, a refrigerant outlet, a condenser cooling water inlet and a condenser cooling water outlet;

(e) a conduit connected to said condenser cooling water outlet connecting to a cooling water return conduit;

(f) a first cooling water pump mounted on said base, said first cooling water pump having a first cooling water pump suction and a first cooling water pump discharge;

(g) a first cooling water pump driver mounted on said base and mechanically connected to said first cooling water pump;

(h) a conduit connected to said first cooling water pump suction for connection to a cooling water source;

(I) a conduit connecting said first cooling water pump discharge and said condenser cooling water inlet;

(j) a refrigerant evaporator mounted on said base for indirect heat exchange between refrigerant and chilled liquid, said refrigerant evaporator having a refrigerant inlet, a refrigerant outlet, a chilled liquid inlet and a chilled liquid outlet;

(k) a conduit from said chilled liquid outlet to a heat exchanger located in the air intake of a combustion gas turbine, (l) a conduit connecting said refrigerant inlet to said refrigerant condenser outlet;

(m) a conduit connecting said refrigerant outlet to said first refrigerant compressor suction;

(n) a first chilled liquid pump mounted on said base, said first chilled liquid pump having a first chilled liquid pump suction and a first chilled liquid pump discharge;

(o) a first chilled liquid pump driver mounted on said base and mechanically connected to said first chilled liquid pump;

(p) a conduit connecting said first chilled liquid pump discharge to said chilled liquid inlet; and (q) a conduit connected to said first chilled liquid pump suction from said heat exchanger located in the air intake of a combustion gas turbine.

2. The modular combustion gas turbine intake air conditioner according to claim 1 further comprising a housing mounted on said base and enclosing said first refrigerant compressor, said first refrigerant compressor driver, said refrigerant condenser, said first cooling water pump, said first cooling water pump driver, said refrigerant evaporator, said first chilled liquid pump, said first chilled liquid pump driver and all of said conduits.

3. The modular combustion gas turbine intake air conditioner according to claim 1 further comprising a second cooling water pump mounted on said base and connected in parallel with said first cooling water pump, a second cooling water pump driver mounted on said base and mechanically connected to said second cooling water pump, a second refrigerant compressor mounted on said base and connected in parallel with said first refrigerant compressor, a second refrigerant compressor driver mounted on said base and mechanically connected to said second refrigerant compressor, a second chilled liquid pump mounted on said base and connected in parallel with said first chilled liquid pump, and a second chilled liquid pump driver mounted on said base and mechanically connected to said second chilled liquid pump.

4. The modular combustion gas turbine intake air conditioner according to claim 1 further comprising:

(r) a thermal oil pump mounted on said base, said thermal oil pump having a thermal oil pump suction and a thermal oil pump discharge;

(s) an ethylene glycol circulation loop connected to said chilled liquid pump suction and said chilled liquid pump discharge;

(t) a thermal oil return conduit mounted on said base connected to said thermal oil pump discharge and having an outlet for connection to a heat exchanger inlet mounted within a combustion gas turbine exhaust;

(u) a thermal oil suction conduit mounted on said base and connected to said thermal oil pump suction for connection to a heat exchanger outlet mounted within a combustion gas turbine exhaust; and (v) an ethylene glycol/thermal oil heat exchanger mounted on said base and connected in said glycol loop and connected to said thermal oil suction conduit to indirectly exchange heat between thermal oil and ethylene glycol.

5. A modular combustion gas turbine intake air conditioner comprising:

(a) a base;

(b) two refrigerant compressors mounted on said base in parallel, each of said refrigerant compressors having a refrigerant compressor suction and a refrigerant compressor discharge;

(c) two refrigerant compressor drivers mounted on said base, one each of said compressor drivers mechanically connected to one of said refrigerant compressors:

(d) a refrigerant condenser mounted on said base for indirect heat exchange between cooling water and refrigerant, said refrigerant condenser having a refrigerant inlet connected to said first refrigerant compressor discharge by a conduit, a refrigerant outlet, a condenser cooling water inlet and a condenser cooling water outlet;

(e) a conduit connected to said condenser cooling water outlet for connection to a cooling water return conduit;

(f) two cooling water pumps mounted on said base in parallel, each of said cooling water pumps having a cooling water pump suction and a cooling water pump discharge;

(g) two cooling water pump drivers mounted on said base, one each of said cooling water pump drivers mechanically connected to one of said cooling water pumps;

(h) a conduit connected to said cooling water pump suctions for connection to a cooling water source;

(i) a conduit connecting said cooling water pump discharges and said condenser cooling water inlet;

(j) a refrigerant evaporator mounted on said base for indirect heat exchange between refrigerant and chilled water, said refrigerant evaporator having a refrigerant inlet, a refrigerant outlet, a chilled water inlet and a chilled water outlet;

(k) a conduit connecting said refrigerant inlet to said refrigerant condenser outlet;

(l) a conduit connecting said refrigerant outlet to said refrigerant compressor suctions;

(m) two chilled water pumps mounted on said base in parallel, each of said chilled water pumps having a chilled water pump suction and a chilled water pump discharge;

(n) two chilled water pump drivers mounted on said base, one each of said drivers mechanically connected to one of said chilled water pumps;

(o) a conduit connecting said chilled water pump discharges to said chilled water inlet;

(p) a conduit connected to said chilled water pump suctions for connection to a heat exchanger located in the air intake of a combustion gas turbine;

(q) a thermal oil pump mounted on said base, said thermal oil pump having a thermal oil pump suction and a thermal oil pump discharge;

(r) an ethylene glycol circulation loop connected to said chilled water pump suction and said chilled water pump discharge;

(s) a thermal oil return conduit mounted on said base connected to said thermal oil pump discharge and having an outlet for connection to a heat exchanger inlet mounted within a combustion gas turbine exhaust;

(t) a thermal oil suction conduit mounted on said base and connected to said thermal oil pump suction for connection to a heat exchanger outlet mounted within a combustion gas turbine exhaust; and (u) an ethylene glycol/thermal oil heat exchanger mounted on said base and connected in said glycol loop and connected to said thermal oil suction conduit to indirectly exchange heat between thermal oil and ethylene glycol.

6. The modular combustion gas turbine intake air conditioner according to claim 1 wherein said chilled liquid is chilled water.

7. A modular combustion gas turbine intake air conditioner comprising:

(a) a base;
(b) a first refrigerant compressor mounted on said base, said refrigerant compressor having a refrigerant compressor suction and a refrigerant compressor discharge;
(c) a first refrigerant compressor driver mounted on said base and mechanically connected to said refrigerant compressor:
(d) a refrigerant condenser mounted on said base for indirect heat exchange between cooling water and refrigerant, said refrigerant condenser having a refrigerant inlet connected to said first refrigerant compressor discharge by a conduit, a refrigerant outlet, a condenser cooling water inlet and a condenser cooling water outlet;
(e) a conduit connected to said condenser cooling water outlet connecting to a cooling water return conduit;
(f) a first cooling water pump mounted on said base, said first cooling water pump having a first cooling water pump suction and a first cooling water pump discharge;
(g) a first cooling water pump driver mounted on said base and mechanically connected to said first cooling water pump;
(h) a conduit connected to said first cooling water pump suction for connection to a cooling water source;
(I) a conduit connecting said first cooling water pump discharge and said condenser cooling water inlet;
(j) a refrigerant evaporator mounted on said base for indirect heat exchange between refrigerant and chilled water, said refrigerant evaporator having a refrigerant inlet, a refrigerant outlet, a chilled water inlet and a chilled water outlet;
(k) a conduit connecting said refrigerant inlet to said refrigerant condenser outlet;
(l) a conduit connecting said refrigerant outlet to said first refrigerant compressor suction;
(m) a first chilled water pump mounted on said base, said first chilled water pump having a first chilled water pump suction and a first chilled water pump discharge;
(n) a first chilled water pump driver mounted on said base and mechanically connected to said first chilled water pump;
(o) a conduit connecting said first chilled water pump discharge to said chilled water inlet;
(p) a conduit connected to said first chilled water pump suction for connection to a said heat exchanger located in the air intake of a combustion gas turbine; and
further comprising a second cooling water pump mounted on said base and connected in parallel with said first cooling water pump, a second cooling water pump driver mounted on said base and mechanically connected to said second cooling water pump, a second refrigerant compressor mounted on said base and connected in parallel with said first refrigerant compressor, a second refrigerant compressor driver mounted on said base and mechanically connected to said second refrigerant compressor, a second chilled water pump mounted on said base and connected in parallel with said first chilled water pump, and a second chilled water pump driver mounted on said base and mechanically connected to said second chilled water pump.

8. A modular combustion gas turbine intake air conditioner comprising:
(a) a base;
(b) a first refrigerant compressor mounted on said base, said refrigerant compressor having a refrigerant compressor suction and a refrigerant compressor discharge;
(c) a first refrigerant compressor driver mounted on said base and mechanically connected to said refrigerant compressor:
(d) a refrigerant condenser mounted on said base for indirect heat exchange between cooling water and refrigerant, said refrigerant condenser having a refrigerant inlet connected to said first refrigerant compressor discharge by a conduit, a refrigerant outlet, a condenser cooling water inlet and a condenser cooling water outlet;
(e) a conduit connected to said condenser cooling water outlet connecting to a cooling water return conduit;
(f) a first cooling water pump mounted on said base, said first cooling water pump having a first cooling water pump suction and a first cooling water pump discharge;
(g) a first cooling water pump driver mounted on said base and mechanically connected to said first cooling water pump;
(h) a conduit connected to said first cooling water pump suction for connection to a cooling water source;
(I) a conduit connecting said first cooling water pump discharge and said condenser cooling water inlet;
(j) a refrigerant evaporator mounted on said base for indirect heat exchange between refrigerant and chilled water, said refrigerant evaporator having a refrigerant inlet, a refrigerant outlet, a chilled water inlet and a chilled water outlet;
(k) a conduit connecting said refrigerant inlet to said refrigerant condenser outlet;
(l) a conduit connecting said refrigerant outlet to said first refrigerant compressor suction;
(m) a first chilled water pump mounted on said base, said first chilled water pump having a first chilled water pump suction and a first chilled water pump discharge;
(n) a first chilled water pump driver mounted on said base and mechanically connected to said first chilled water pump;
(o) a conduit connecting said first chilled water pump discharge to said chilled water inlet;
(p) a conduit connected to said first chilled water pump suction for connection to a heat exchanger located in the air intake of a combustion gas turbine,
(q) a thermal oil pump mounted on said base, said thermal oil pump having a thermal oil pump suction and a thermal oil pump discharge;
(r) an ethylene glycol circulation loop connected to said chilled water pump suction and said chilled water pump discharge;
(s) a thermal oil return conduit mounted on said base connected to said thermal oil pump discharge and having an outlet for connection to a heat exchanger inlet mounted within a combustion gas turbine exhaust;
(t) a thermal oil suction conduit mounted on said base and connected to said thermal oil pump suction for connection to a heat exchanger outlet mounted within a combustion gas turbine exhaust; and
(u) an ethylene glycol/thermal oil heat exchanger mounted on said base and connected in said glycol loop and connected to said thermal oil suction conduit to indirectly exchange heat between thermal oil and ethylene glycol.

* * * * *